US007600048B2

(12) United States Patent
Guest

(10) Patent No.: US 7,600,048 B2
(45) Date of Patent: Oct. 6, 2009

(54) WEB SERVICES PROCESSING USING MAPI COMPLIANT MAIL APPLICATIONS

(75) Inventor: Simon M. Guest, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 825 days.

(21) Appl. No.: 11/072,384

(22) Filed: Mar. 4, 2005

(65) Prior Publication Data
US 2006/0200522 A1 Sep. 7, 2006

(51) Int. Cl.
G06F 15/16 (2006.01)
(52) U.S. Cl. .................. 709/250; 709/203; 709/206
(58) Field of Classification Search .......... 709/206, 709/202, 203, 250
See application file for complete search history.

(56) References Cited

U.S. PATENT DOCUMENTS

| 5,818,447 | A  | * | 10/1998 | Wolf et al.     | 715/752 |
|-----------|----|---|---------|-----------------|---------|
| 5,917,489 | A  | * | 6/1999  | Thurlow et al.  | 715/809 |
| 6,405,225 | B1 | * | 6/2002  | Apfel et al.    | 715/210 |
| 6,549,950 | B2 | * | 4/2003  | Lytle et al.    | 709/246 |
| 2005/0038859 | A1 | * | 2/2005 | Gardner et al. | 709/206 |
| 2006/0129655 | A1 | * | 6/2006 | Schlimmer et al. | 709/217 |

OTHER PUBLICATIONS

John R. Hines, Software Engineering, Jan. 1996, IEEE Spectrum, pp. 60-64.*
Methot, John, "Accessing WebLogic Workshop Web Services via E-mail (SMTP)", Published on dev2dev, Sep. 10, 2002- http://dev2dev.bea.com/pub/a/2002/10/DJ_002.html.
International Business Machines Corporation: "Cross platform instant messaging using web services", Research Disclosure, Mason Publications, Hampshire, GB, vol. 1. 458, No. 156, Jun. 2002.
Walter, Roger, "XML Web Services Basics", Dec. 2001- http://msdn.microsoft.com/library/default.asp?url=/library/en-us/dnwebsrv/html/webserbasics.asp.
Curbera, Francisco, et al. "Unraveling the Web Services Web: An Introduction to SOAP, WSDL, and UDDI", IEEE Internet Computing, IEEE Service Center, New York, NY, vol. 6, No. 2, 2002, pp. 86-93.
Maheshwari, Piyush, et al., "Enhancing Web Services with Message-Oriented Middleware", Proceedings of the IEEE International Conference on Web Services, Jul. 5, 2004.

* cited by examiner

Primary Examiner—Andrew Caldwell
Assistant Examiner—Esther Benoit
(74) Attorney, Agent, or Firm—Workman Nydegger

(57) ABSTRACT

The present invention provides Web Services over a mail transport. In particular, the present invention sends Web Service messages using MAPI (Messaging Application Program Interface) mail applications in order to support offline communications and extended processing time of service requests without creating additional infrastructure for such message exchanges. A custom layer transport is configured to: identify that a Web Service message is to be sent across a mail transport; use the MAPI application to generate a mail message; and include the Web Service message and other identifiers within the mail message. The message is then sent to the outgoing mailbox of the MAPI application for subsequent delivery to an endpoint. Upon receiving the mail message, the endpoint can extract the Web Service message and process it accordingly. Other example embodiments also provide for requesting NPDL (Network Protocol Description Language) data structures (e.g., WSDL documents) by a similar process.

17 Claims, 5 Drawing Sheets

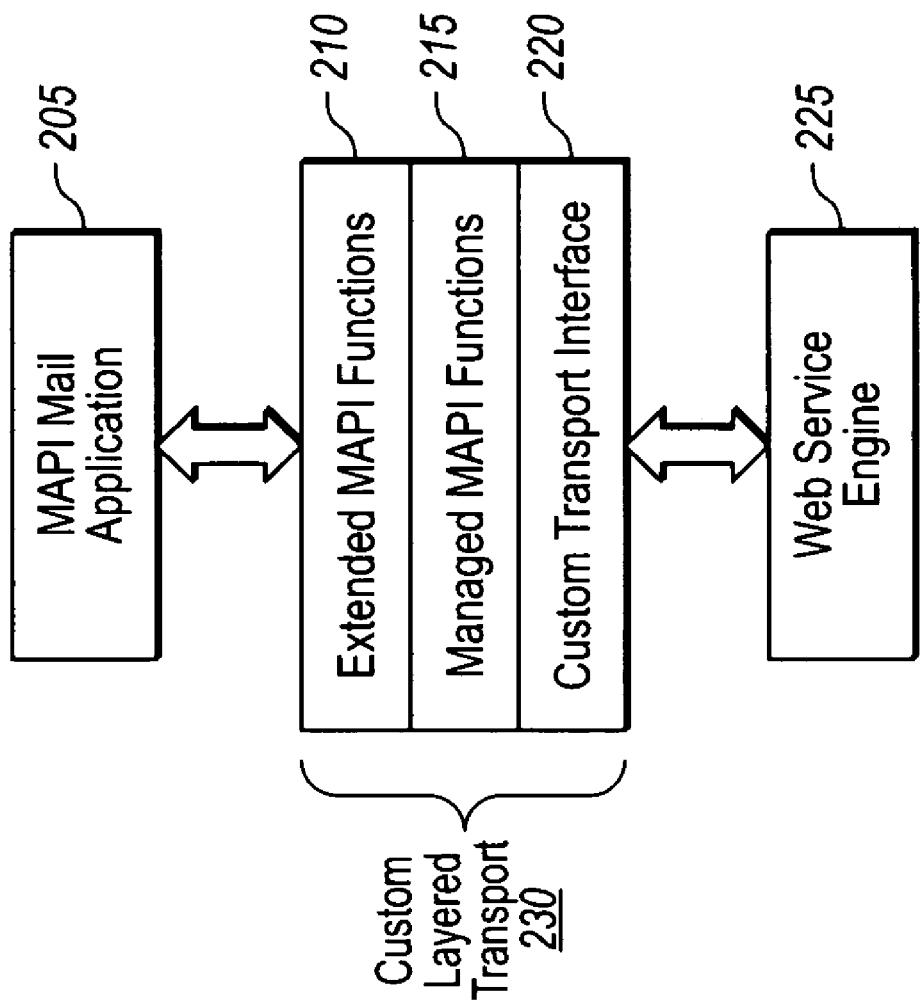

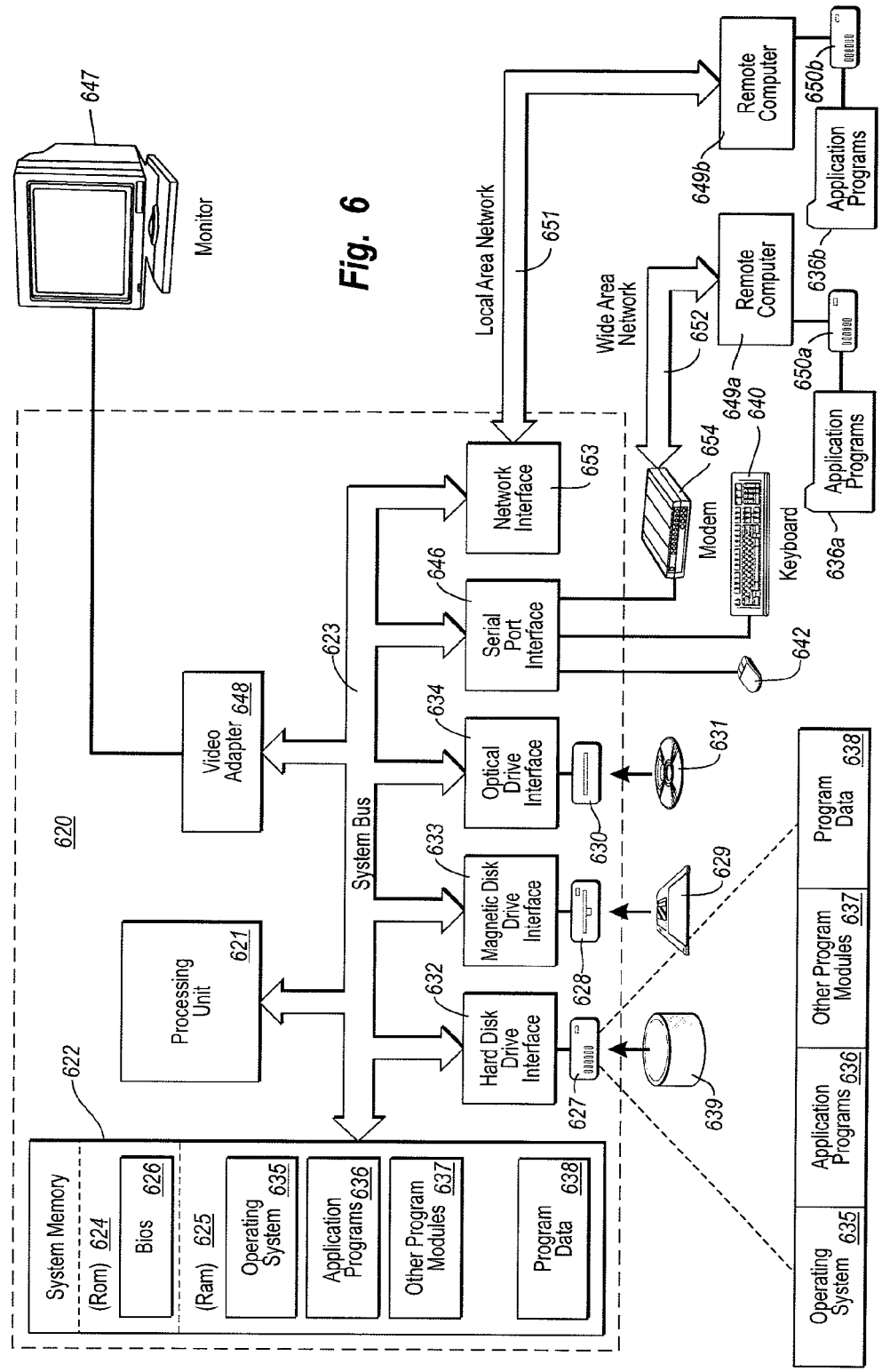

WEB SERVICES PROCESSING USING MAPI COMPLIANT MAIL APPLICATIONS

CROSS-REFERENCE TO RELATED APPLICATIONS

N/A

BACKGROUND OF THE INVENTION

1. The Field of the Invention

The present invention generally relates to binding mechanisms used in Web Services and other distributed systems. More specifically, the present invention provides Web Services over a mail message transport using a MAPI (Messaging Application Program Interface) compliant mail application in order to support offline communications and extend the processing time of service requests without creating additional infrastructure for such message exchanges.

2. Background and Related Art

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Web Services has been a driving force in advancing such communications between computer systems and is turning the way we build and use software inside-out.

Web Services let applications share data, and—more powerfully—invoke capabilities from other applications without regard to how those applications were built, what operating system or platform they run on, and what devices are used to access them. Web Services are invoked over the Internet by means of industry-standard protocols including SOAP (Simple Open Access Protocol), XML (eXtensible Markup Language), UDDI (Universal Description Discovery Integration), WSDL (Web Service Description Language), etc. Although Web Services remain independent of each other, they can loosely link themselves into a collaborating group that performs a particular task.

Often, electronic communication on a Web Service network includes a client computer system (hereafter referred to as a "client") requesting access to a network service (e.g., Web Services) at a server computer system (hereinafter referred to as a "server," "service," or "Web Service"). Accordingly, the client sends a request to the service for particular access to its system resources, wherein if the client is authorized and validated, the service responds with a response message providing the desired information. Of course, other messaging patterns between client and service are available and include simple singleton messages as well as more sophisticated multi-message exchanges like, e.g., notifications, solicit-response, pub-sub patterns, polling, kick-push, queuing, and others. Further, these types of communication are governed by various requirements and capabilities defined by both the client and the service in contracts for distributed systems (e.g., Web Services).

A contract is an expression of visible aspects of a service (or client) behavior. A contract is represented by a mixture of machine-readable languages and human language. Besides the obvious opportunity for additional precision, machine-readable languages enable tooling to construct partial service implementations, automate service deployment, audit/validate messages exchanged, manage services, and enable a host of other network-related functions. Due, however, to limitations in the expressive power of machine-readable languages, human languages remain an important component of contracts—principally to describe message and message exchange pattern semantics.

Network Protocol Description Languages (e.g., WSDL) provide an overall wrapper or specification for describing contracts (e.g., Web Services Contracts) in a common or standard language. Such specifications make it easy for developers and developer tools to create and interpret contracts. These Network Protocol Description Languages (hereinafter referred to as "NPDL") have extensive tooling suites, which in large part accounts for their popularity. Until recently, these NPDLs bound contracts to a single transport or binding mechanism, which describes how to encapsulate or format a message (e.g., SOAP envelope) and what transport to use for exchanging the message with a service (e.g., HTTP (Hyper Text Transport Protocol).

Currently, Web Service implementations use HTTP as their primary transport, partially because of its ubiquitous nature. Although HTTP has grown in popularity as a transport for Web Services, HTTP also has some widely recognized limitations. For example, HTTP is a request-response style transport, which supports synchronous style transactions. This type of message exchange pattern, however, present challenges for asynchronous communication. For instance, a Web Service client must keep-alive a connection to obtain any response from the Web Service. This makes long running transactions (e.g., a mortgage application that takes several days to process) difficult to implement using HTTP without creating a mechanism where the client constantly polls the server for updates. Such polling creates an unnecessary use of precious system resources.

Another problem with HTTP is that it is a connection based protocol. Accordingly, each endpoint in a message exchange pattern (i.e., client and service) must be alive and active to complete an HTTP request-response. In situations where this is unlikely (e.g., a client trying to connect to Web Services at some remote location), the message would be considered undeliverable and the system would fail since HTTP protocol does not support caching and storage of messages.

Still another problem with using HTTP in a Web Services environment is that the use of HTTP requires additional infrastructure. For example, to host a Web Service using HTTP requires infrastructure and setup. To support a hosted Web Service, each computing device needs to be able to accept incoming HTTP requests, which calls for installation of a Web server or equivalent functionality for each computer. This introduces new management and security issues, and as a result can be a challenge in some environments, e.g., a casual computer user or users who are otherwise not familiar with configuring Web servers.

The above limitations are already generating ideas and implementations of alternative transports that can support Web Services. Accordingly, various Web Service engines allow developers to write or extend the bindings or binding mechanisms to include a number of encapsulation and transport protocols. For example, developers can customize the transports to include one or more of the following: FTP (File Transfer Protocol), SMTP (Simple Message Transfer Protocol), TCP (Transmission Control Protocol), UDP (User Datagram Protocol), etc. Although these binding extensions allow advantageous features of other transports to be utilized they do not address the above-identified deficiencies of HTTP.

For example, when an SMTP binding is used, a standard mail message is generated wherein the body of the message includes the Web Service message, which is then transferred across the wire to the other endpoint. Although using the SMTP transport may have advantageous features over HTTP, using SMTP in this fashion still requires that each endpoint be connected via the SMTP transport. In addition, the generation and encapsulation of the Web Service message within the mail message requires addition infrastructure, again leading to management and security issues as described above.

Accordingly, there exists a need for a Web based service infrastructure that allows for extended asynchronous communications, supports offline or connectionless intervals, and utilizes existing infrastructure for exchanging messages in the Web Service environment.

BRIEF SUMMARY OF THE INVENTION

The above-identified deficiencies and drawbacks of current Web Service binding mechanisms are overcome through exemplary embodiments of the present invention. For example, the present invention provides for Web Services over a mail transport that utilizes a MAPI (Messaging Application Program Interface) compliant mail application in order to support offline communications and extend processing time of service requests without creating additional infrastructure for such message exchanges. In addition, the present invention provides for distribution of NPDL (Network Protocol Description Language) data structures for a Web Service application over a mail transport by utilizing a MAPI compliant mail application in order to support offline communications and generate the NPDL data structure without having to access the Web Service application.

For example, embodiments provide for receiving a Web Service message that includes an addressing scheme identifying the use of a MAPI compliant mail application for sending the Web Service message, which is part of a message exchange pattern between a client and a Web Service that communicate over a mail message transport. An endpoint mailing address within the addressing scheme is then identified for sending the Web Service message to a corresponding endpoint. Thereafter, a mail message using a MAPI compliant mail application is generated. The mail message including the endpoint mailing address, the Web Service message, and an identifier for identifying the Web Service and message exchange type (e.g., request, response, etc.) for the Web Service message. Thereafter, the mail message is sent to an outgoing mailbox of the MAPI compliant mail application for subsequent delivery to the endpoint over the mail message transport.

In another example embodiment, a mail message is received over a mail message transport. The message being received at an incoming mailbox of a MAPI compliant mail application corresponding to an endpoint Web Service application. Thereafter, the mail message is identified as including an endpoint mail address corresponding to the MAPI compliant mail application, a Web Service message that is part of a message exchange pattern between a client and a Web Service, and an identifier for identifying the Web Service and a message exchange type for the Web Service message. Based on the Web Service and message exchange type for the Web Service message, the Web Service message is sent to the endpoint Web Service application for processing.

Other example embodiments provide for distributing an NPDL (e.g., a WSDL data structure) over a mail transport. This exemplary embodiment provides for receiving, from an endpoint, a mail message at an incoming mailbox of a MAPI compliant mail application associated with a Web Service application. The mail message is then identified as requesting an NPDL data structure, which is a specification for describing one or more contracts that an endpoint application complies with when exchanging messages with the Web Service application. Thereafter, a NPDL data structure is automatically generated without accessing the Web Service application. The NPDL data structure is then sent to the endpoint.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a example interface layering within a transport for communicating between a Web Service engine and a MAPI mail application in accordance with example embodiments of the present invention;

FIG. 6 illustrates an example system that provides a suitable operating environment for the present invention.

DETAILED DESCRIPTION OF THE PREFERRED EMBODIMENTS

Figure 1A:
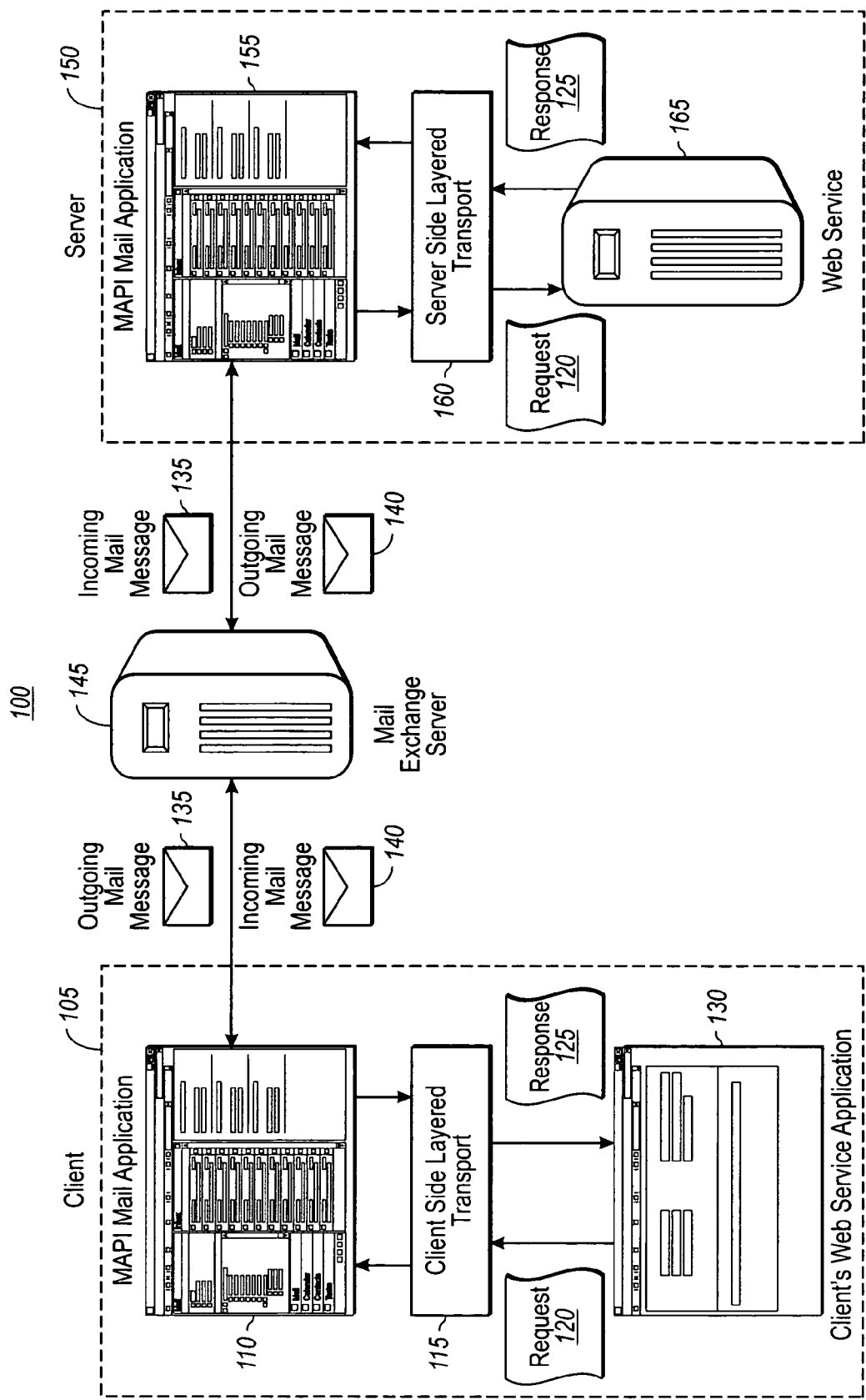
FIG. 1A illustrates a distributed system that utilizes MAPI mail applications for exchanging messages between a client and a Web Service in accordance with example embodiments of the present invention.

The present invention extends to methods, systems and computer program products for exchanging Web Service messages between a client and a Web Service over a mail transport using a MAPI compliant mail application. In addition, the present invention provides for communicating NPDL data structures to a requesting endpoint via a MAPI compliant mail application. The embodiments of the present invention may comprise a special purpose or general-purpose computer including various computer hardware, as discussed in greater detail below.

The present invention provides for utilizing a MAPI (Messaging Application Program Interface) compliant mail application for exchanging messages for Web Services over a mail transport. Examples of MAPI compliant mail application include, Microsoft Outlook®, Microsoft Outlook Exchange®, Microsoft Exchanges, Qualcomm's® Eudora®, and other similar email applications that can communicate with a mail exchange server or mail store. Other exemplary embodiments also include using these MAPI compliant mail applications for requesting NPDL (Network Protocol Description Languages) data structures, e.g., WSDL (Web Service Description Language) documents, which allows client and service developers at design time to access these documents without having to access the corresponding Web Service application.

The above-identified MAPI compliant mail applications are incredible pervasive technology in that everyday numerous people worldwide use these applications to exchange messages. The capability to use such MAPI compliant mail application as a transport for Web Service messages exchanged between applications becomes incredibly powerful. For example, taking the challenges previously outlined with HTTP one can start to see why the use of MAPI compliant mail applications has tremendous benefits over the prior art. In particular, such MAPI compliant mail applications offer a far more asynchronous model over HTTP and other similar transports. A user of a MAPI compliant mail application can send a message and then expect a reply a few minutes, hours, or even days later. Accordingly, when this is applied to Web Services, a MAPI mail application can be used to send a Web Service request and then receive a response a few minutes, hours, or days later. This asynchronous style of interaction is difficult, and in some instances impossible, to achieve using HTTP or other transports.

Further, MAPI mail applications support the construction of a mail message in an offline environment. For example, if a user is in a remote location without access or connectivity to a mail exchange server, the user may still create messages using the MAPI compliant mail application, wherein such messages are stored in an outgoing mailbox of such applications. These messages can then be sent the next time the user connects with the mail exchange server. A similar process applies to a model where Web Services in conjunction with a MAPI compliant mail application can be used to overcome such deficiencies of HTTP and other similar transport protocols. In particular, the present invention allows applications that can construct a Web Service message (e.g., a request or response) to store the Web Service message as a normal mail message within the outgoing mailbox of a MAPI mail application. Accordingly, the present invention supports offline processing of Web Service messages and the next time the user is connected to the network, the message may be sent to the desired endpoint.

Another advantage of the present model is that no additional infrastructure is required. As mentioned previously, supporting incoming HTTP request typically requires the installation of a Web Server which can lead to management and security issues. With the use of MAPI mail applications in accordance with example embodiments herein, all that is required is a mailbox for an endpoint. Incoming mail Web Service messages can be sent to this mailbox without the overhead of any additional software or installations.

The present invention also has several advantageous features over other current models that use an SMTP transport for exchanging messages between endpoints in a Web Service environment. For example, using the MAPI mail application in accordance with example embodiments provides the ability to work offline since such applications support the use of an outgoing mailbox, which is specific to the MAPI compliant mail application—not the protocol or transport. In addition, the use of a MAPI mail application provides for no duplication of configuration. For example, when using a native or current SMTP channel, the Web Service client and service still need to know certain details about the email account. This includes, for example, the location of the SMTP server, location of a POP3 server, user name, and password. When using MAPI mail applications in accordance with the present invention, all of this information is already configured within the application; and therefore does not need to be duplicated.

Still other advantageous features of the present invention include extending the transports used for exchanging messages in a distributed environment. For example, many MAPI mail applications allow messages to be transported on other transports aside from SMTP. For example, these MAPI mail applications may be extended to transport messages using Hotmail, X.25, DEC All-In-1, and others. Given some of the above identified benefits, the following is a more detailed description of how the MAPI mail applications are used to achieve these desired results.

FIG. 1A illustrates a distributed system that utilizes MAPI mail applications for exchanging messages between a client and a service in accordance with example embodiments. In the following description of FIG. 1A, as well as other Figures described herein, reference will occasionally be made to mail address for a client, server, or applications associated therewith. As one would recognize, such mailing addresses are usually bound to individuals or companies, and not to any particular machine or application. Although a "mail address" as described herein will typically be bound to individual users of the client or service, it can also extend to applications or machines where applicable. Accordingly, any specific mailing address as used herein should be broadly interpreted to be bound to individuals, companies, applications, or machines.

As shown in FIG. 1A, both the client 105 and the server 150 are installed with or include instances of MAPI mail applications 110, 155, respectively. Note that for the purposes of simplifying the diagram, both instances of the MAPI mail applications 110, 155 are shown using the same mail exchange server 145; however, there may be other mail exchange servers 145 used throughout the distributed system 100. The only prerequisite with the present invention, is that the instance of the MAPI mail application 110 on the client 105 has the ability to exchange (send and receive) mail messages with the instance of the MAPI mail application 155 on the server 150.

In the example in FIG. 1, client 105 runs a Web Service application 130, which is a custom application that is configured to make calls with the Web Service 165. Similarly, the server 150 hosts and runs Web Service 165. Note, however, that for the purposes of this application the term "Web Service application" should be broadly construed to include both the client's Web Service application 130 and the server side Web Service 165 unless otherwise explicitly identified. Further, both the client's Web Service application 130 and the Web Service 165 are bound to MAPI applications 110, 155, respectively, using custom layered transports on the client's side 115 and on the server side 160. As will be described in greater detail below, both of these layer transports 115, 160 may have several layered interfaces that are used to communicate messages between both Web Service applications 130, 165 and their corresponding MAPI mail applications 110, 155.

The following gives a brief overview of a request-response message exchange pattern between the client 105 and the server 150. Note, however, that other message exchange patterns are also available to the present invention. Accordingly, the use of the request-response message exchange pattern in describing example embodiments of FIG. 1A and other figures is for illustrative purposes only and is not meant to limit or otherwise narrow the scope of the present invention unless explicitly claimed.

In this example, the client's Web Service application 130 creates a Web Service request 120, which includes (as described in greater detail below) a custom addressing scheme that specifies the location of the mail address used by the server's 150's MAPI mail application 155. Using the client side layer transport 115, the Web Service request message 120 can be forwarded to the MAPI mail application 110 through one or more direct APIs (Application Program Interfaces), as described below. The MAPI mail application 110 will create an outgoing mail message 135 for the request 120 and puts the outgoing mail message 135 in its outgoing mailbox (not shown). Note that although the outgoing mail message 135 is sent or stored in the outgoing mailbox, other processes for posting the mail message 135 in the outgoing mailbox are also available to the present invention. For example, the mail message 135 may be directly created within the outgoing mailbox. Accordingly, the sending or storing of the mail message 135 (as well as other mail messages described herein) in an outgoing mailbox should be broadly construed to include any well known way of placing or creating mail messages within the outgoing mailbox.

In any event, the outgoing mail message may include the mail address that is bound to the Web Service's 165's MAPI mail application 155, the Web Service request 120 message, and an identifier for identifying the Web Service 165 and the mail exchange type for the Web Service message (i.e., in this example a request 120). When the MAPI mail application 110 is connected to the appropriate mail exchange server 145, the outgoing mail message 135 is sent as an incoming mail message 135 to the server's 150's MAPI mail application 165. Typically, this incoming mail message 135 will be a SOAP envelope in plain text. Note, however, that the present invention is not limited to any particular encapsulation and/or formatting for the mail messages exchanged. Accordingly, the use of SOAP envelope and plain text for transferring mail messages 135, 140 is for illustrative purposes only and is not meant to limit or otherwise narrow the scope of the present invention unless explicitly claimed.

When the incoming mail message 135 arrives at the MAPI mail application 155, it may be sent to the MAPI mail application's 155's incoming mailbox. By way of the identifier within the incoming mail message 135, the server side layered transport 160 may identify the incoming mail message 135 as including request 120 and hands it to the corresponding Web Service 165 for processing. Note that although the identifier is used to identify the incoming mail message 135 as including request 120, exemplary embodiments also provide for other ways for identifying the message as including request 120. For example, the message may be identified through a filtering process, wherein the MAPI mail application 155 can identify the subject matter in the incoming mail message 135 as a request. In such instance, it may be filtered to a specific folder using various rules set by the server developer. Accordingly, the server side layer transport 160 upon seeing a message within the filtered folder can automatically assume that the incoming mail message 135 includes a request 120 and send it to the Web Service 165 for processing. Accordingly, the use of the term "identifier", as described in greater detail below, for identifying the request 120 (or other types of Web Service messages) within incoming mail message 135 should be broadly construed to include other well known ways of identifying messages as including specific content.

In any event, upon a successful handoff of the request message 120 to the Web Service 165, the incoming mail message 135 may be deleted from the server's 150's MAPI mail application 155 incoming mailbox (e.g., move to the deleted items folder). If this was just one-way message exchange pattern, the process would end here. In this example, however, Web Service 165 can send a response 125 in a similar manner as that described above.

In particular, the Web Service 165 constructs the response 125 and uses the server side layer transport 160 to hand the response to the MAPI mail application 155. The MAPI mail application 155 then constructs an outgoing mail message 140 that includes the client's 105 mailing address (or an address otherwise corresponding to the client), the Web Service response 125, and an identifier for identifying the Web Service 165 and the mail exchange type, i.e., response 125. The outgoing mail message 140 is then stored in the outgoing mailbox (not shown) on the server 150 and sent to the mail exchange server 145 when the server 150 is connected thereto. When the client is connected to the mail exchange server 145, the outgoing mail message 140 is sent as an incoming mail message 140 to the instance of the MAPI mail application 110 on the client 105 side. The client side layer transport 115 may then recognize the incoming mail message 140 as including a response 125 (similar to the process described above with regard to the server 150) and hands it back to the clients Web Service application 130 for processing.

FIG. 2 illustrates a more detailed example of the layered transports 115, 160 for binding the Web Service 165 or Web Services application 130 to their corresponding MAPI mail applications 155, 110. As shown, a Web Service engine 225 (e.g., WSE (Web Service Enhancement)) utilizes various custom APIs 210, 215, 220 within custom layered transport 230. Note that although these APIs 210, 215, 220 are shown as separate interfaces, the functionality of these may be combined to form a single application programming interface. Accordingly, the use of separate interfaces and the functionality thereof are for illustrative purposes only and are not meant to limit or otherwise narrow the scope of the present invention unless explicitly claimed.

Nevertheless, as shown custom layer transport 230 consists of three elements, which include custom transport interface 220, managed MAPI functions 215, and extended MAPI functions 210. The custom transport interface layer 230 implements various interfaces and processes required for the Web Service engine 225 transport. This layer 220 outlines the channels that will be used, together with an addressing scheme (as described in greater detail below) and processes that handle events for the transport (e.g., what to do when a new message arrives). This custom transport interface 220 also supports the generation of NPDL documents (e.g., WSDL documents) such that a developer can send a mail message to the Web Service and request the NPDL document for designing and building a client that will work with the service. This process and addressing scheme for requesting such NPDL document is described in greater detail below with regard to FIG. 1B.

The managed MAPI functions 215 layer is used in converting the Web Services request from the Web Service engine 225 form (commonly known as SOAP envelopes) into mail messages. Part of the functionality of this layer 215 is to correctly handle the addressing such that ambiguous mail addresses are handled correctly. This layer 215 may be developed in managed (.Net) code, hence the name.

There may be several functions that the managed layer 215 cannot perform due to, e.g., the security model within various MAPI mail applications 205. These functions may include obtaining a mail address and body text for an existing mail message. Accordingly, to overcome this, exemplary embodiments provide for the extended MAPI functions 210 layer, which is configured to perform a number of functions that interact with the MAPI mail application 105. This extended MAPI function layer 210 may be shipped as part of the MAPI mail application 205.

As previously mentioned, the present invention uses a custom addressing scheme for identifying the use of a MAPI compliant mail application for sending Web Service messages (e.g., request, response). Note that although the following description of the addressing scheme utilizes a specific form for identifying endpoint mailing addresses and identifying that Web Service messages are to be exchanged using a MAPI compliant mail application, other well known ways of identifying these features are available to the present invention. Accordingly, the following addressing scheme and other identifiers as described herein are for illustrative purposes only and are not meant to limit or otherwise narrow the scope of the present invention unless explicitly claimed.

The example addressing scheme in accordance with exemplary embodiments is similar to the modeling of typical URLs (Uniform Resource Locators). For example, a URL is made up of several distinct parts including the transport (e.g., "http://"), the host name (e.g., "www.companyname.com"), and the page being requested (e.g., "/biztalk/default.aspx"). Web Services running over an HTTP transport follow a similar convention. For example, given an address of http://myserver/services/service1.asmx: the transport is again "http://"; "myserver" is the host name, and "/services/service1.asmx" identifies the Web Service being requested.

Exemplary embodiments of the present invention use a similar addressing scheme for the MAPI mail application identifiers. For example, a addressing scheme of soap.mapimailapplicationname://to/sguest@company.com is separated into the following: the "soap.mapimailapplicationname://" defines the transport to use; the "to" is the host name (used to conform to URI naming conventions, but is typically ignored by the design); and "/sguest@company.com" is the email address of the Web Service or client (depending on whether this is a request, response, or other type of message exchange).

Using the above format also allows the transport to address multiple services, similar to the way that an email can address multiple recipients. This may be preformed by appending the addresses on the URL, e.g., soap.mapimailapplication://to/squest@company.com; account@company.com. This addresses the request to services running on both squest@company.com and accounts@company.com.

It is noted that the addressing scheme may not include the name of the Web Service. Instead example embodiments place the Web Service's name (or other means for identifying the service, such a assigned code) and the message exchange type in an identifier. The identifier may be placed in a specific field, e.g., the subject line of the mail message. The format of these identifiers may be as follows: <servicename>request, which identifies a request for the service; and <servicename>requestresponse, which identifies a response to a previous request. Note that although a specific format is used for identifying the request and/or the response other ways of identifying the message exchange pattern are also available to the present invention. For example, for a request an abbreviation of "req" may be used, where as for the response an abbreviation of "resp" may be used. Accordingly, the above examples for identifying message exchange pattern and the format that they appear within the identifier are used for illustrative purposes only and are not meant to limit or otherwise narrow the scope of the present invention unless explicitly claimed.

As previously mentioned, exemplary embodiments also provide for a requesting and receiving a NPDL document (e.g., WSDL document) for creating requests 120 that are compatible with communicating to the Web Service 165. As one would recognize, such NPDL data structures give specifications for describing one or more contracts that a client Web Service application 130 complies with when exchanging messages with the Web Service application 165.

Figure 1B:
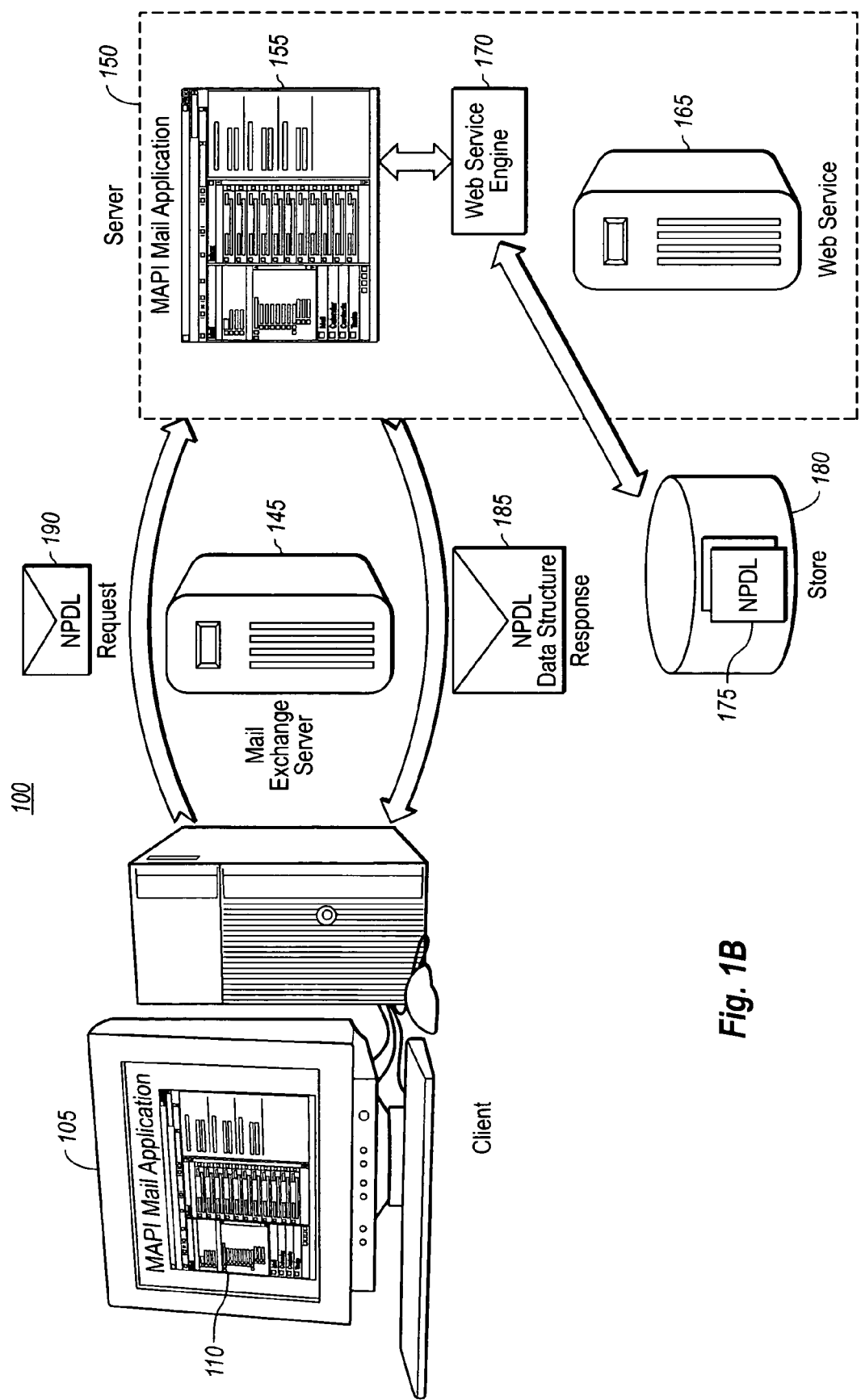
FIG. 1B illustrates a distributed system for requesting a NPDL document using MAPI mail applications in accordance with example embodiments of the present invention.

FIG. 1B illustrates a distributed system 100 that allows a developer (not shown) or application to request and receive an NPDL data structure 185 in accordance with exemplary embodiments. As shown a developer or application can use the MAPI mail application 110 running on the client 105 to create a mail message 190 that is a request for the NPDL 175 for the Web Service 165. The request 190 is sent via the mail exchange server 145 to the server's 150's MAPI mail application 155 incoming mailbox. The request 190 should include an identifier for identifying the Web Service 165 and the type of request, which is a request for a NPDL document. Such identifier may be included in the subject line or some other filed of the request 190. For example, the identifier "<servicename>?WSDL" may be included in the subject line of the request message 190, identifying the message 190 as a request for a NPDL document corresponding to the Web Service 165. Note again, however, that other ways of identifying the service and/or the request for a NPDL are available to the present invention; and therefore the above-identified location of the identifier within the message 190 and the specific form of identifier are for illustrative purposes only and are not meant to limit or otherwise narrow the scope of the present invention unless explicitly claimed.

Web Services engine 170 can identify the request mail message 190 by way of the identifier and use such to generate an NPDL data structure 175, which can then be sent to client in, e.g., a mail message response 185. Note that although the NPDL data structure 175 in FIG. 1B is retrieved from store 180, other example embodiments provide for allowing the Web Service engine 170 to dynamically generate it on-the-fly. Further note that although in this example the NPDL data structure is sent in a response mail message 185, the NPDL data structure may be sent using other transports. For example, the request 190 may specify a different transport to use and/or a different address to send the NPDL data structure to. Accordingly, how the NPDL data structure is created and the use of a mail message for returning the NPDL data structure 185 are for illustrative purposes only and it is not meant to limit or otherwise narrow the scope of the present invention unless explicitly claimed.

Note that because the Web Service engine 170 can dynamically generate or retrieve the NPDL 175 from a store 180 or by other means, without accessing or requesting such from the Web Service 165, this embodiment has several advantageous features. For example, because the Web Service 165 is not accessed during this process, the Web Service's 165's resources can be utilized for processing other requests. This example embodiment for obtaining a NPDL data structure also has the added advantage of being able to request such in an offline environment, since a MAPI mail application 110 is used for the request 190. In particular, the request 190 may first be sent to the outgoing mailbox of the MAPI application 110 in an offline environment, and then when connection to the mail exchange server 145 is available, the request 190 can be sent to the server 145, 150.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flowcharts for FIGS. 3-5—is used to indicate the desired specific use of such terms.

Figure 5:
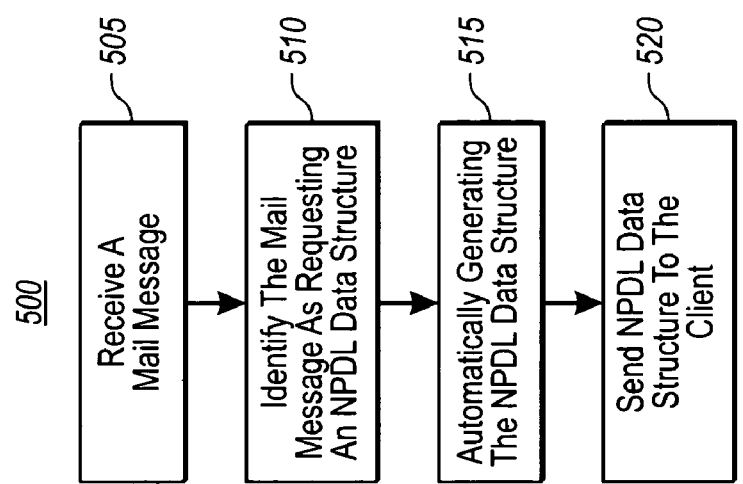
FIG. 5 illustrates a flow diagram of a method of providing a NPDL data structure for a Web Service application of a mail transport in accordance with example embodiments of the present invention.
Figure 4:
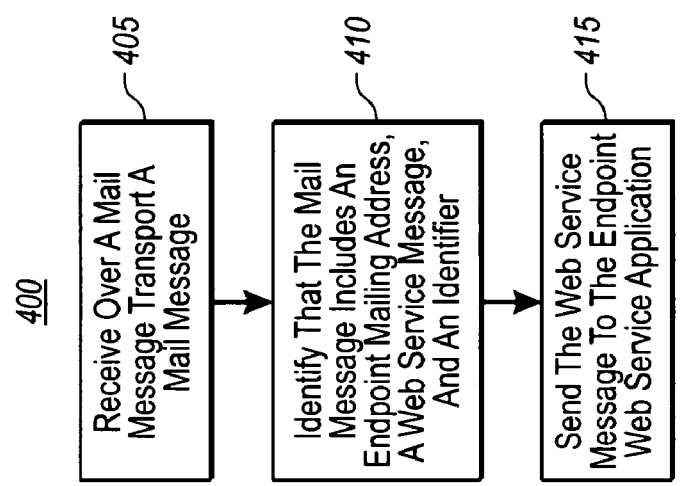
FIG. 4 illustrates another flow diagram of a method for providing Web Services over a mail transport in accordance with example embodiments of the present invention.
Figure 3:
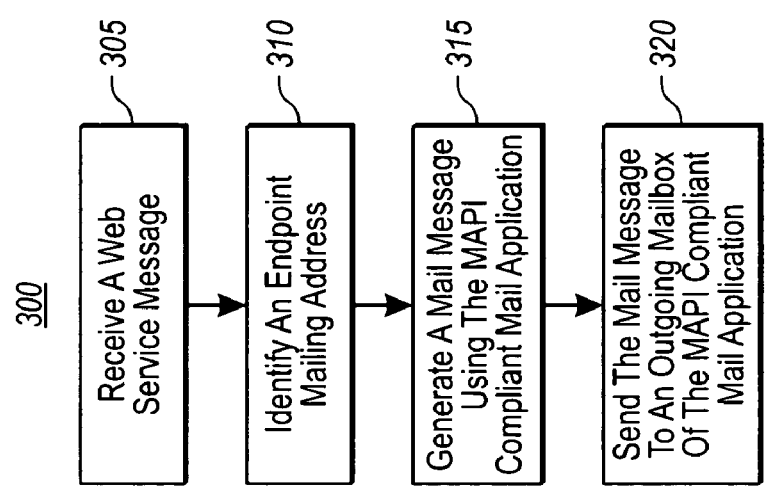
FIG. 3 illustrates a flow diagram of a method for providing Web Services over a mail transport in accordance with example embodiments of the present invention.

FIGS. 3-5 illustrate flowcharts for various exemplary embodiments of the present invention. The following description of FIGS. 3-5 will occasionally refer to corresponding elements from FIGS. 1A, 1B, and 2. Although reference may be made to a specific element from these Figures, such elements are used for illustrative purposes only and are not meant to limit or otherwise narrow the scope of the present invention unless explicitly claimed.

FIG. 3 shows a flow diagram for a method 300 of providing Web Services over a mail transport by utilizing a MAPI compliant mail application in order to support offline communications and extend the processing time of service requests without creating additional infrastructure for such message exchanges. Method 300 includes an act of receiving 305 a Web Service message. For example, either client side 115 or server side 160 layered transports may receive a Web Service message 120, 125, depending on whether the Web Service message is a request 120 or a response 125. The Web Service message 120, 125 should include an addressing scheme identifying the use of a MAPI compliant mail application 110, 155 for sending the Web Service message 120, 125 as part of a message exchange pattern between client 105 and Web Service 165 that communicate over a mail message transport. The MAPI compliant mail application might be one of Microsoft Outlook®, Outlook Express®, Eudora®, etc. Further, the mail message transport may be one of SMTP, Hotmail™, X.25, DEC All-In-1, or others.

In any event, method 300 further includes an act of identifying 310 an endpoint mailing address. For example, various layers 210, 215, 220 within custom layer transport 230 may be used to identify an endpoint mailing address (for the client 105 or server 150) within addressing scheme for sending the Web Service message 120, 125 to a corresponding endpoint 105, 150. Method 300 also includes an act of generating 315 a mail message using a MAPI compliant mail application. For example, MAPI mail application 110, 155 may be used to generate outgoing mail message 135, 140. The mail message should include the endpoint mailing address, the Web Service message 120, 125, and an identifier for identifying the Web Service 165 and the message exchange type for the Web Service message 120, 125 (e.g., request, response, etc.).

Method 300 further includes an act of sending 320 the mail message to an outgoing mailbox of the MAPI compliant mail application. For example, the custom layered transport 230 can send mail message 135, 140 to MAPI mail application's 110's, 155's outgoing mailbox for subsequent delivery to the endpoint 105, 150 over the mail message transport. As previously mentioned, one or more APIs may be used 210, 215, 220 in custom layer transport 230 to generate the mail message 135, 140 and send the mail message 135, 140 to the outgoing mailbox of the MAPI compliant mail application 110, 155.

Other exemplary embodiments provide that the Web Service message 120, 125 is a request message 120 from the client 105 and the endpoint is the Web Service 165. In this exemplary embodiment, the mail message 135 is sent to the endpoint 165 mailing address. Another mail message 140 is then received at an incoming mailbox of the MAPI compliant mail application 110. The mail message 140 includes a mailing address for the client 105, a Web Service response 125 to the request 120, and an identifier for identifying the Web Service 165 and message exchange type indicating that the mail message 140 includes the Web Service response 125. Thereafter, the Web Service response 125 may be sent to the client's Web Service application 130 for further processing.

FIG. 4 illustrates a flow diagram of a method 400 of providing Web Services over a mail transport by utilizing a MAPI compliant mail application. In this example embodiment, method 400 includes an act of receiving 405 over a mail message transport a mail message. For example, either client 105 or server 150 may receive a mail message 135, 140 over a mail message transport at an incoming mailbox of a MAPI compliant mail application 110, 155 corresponding to an endpoint 105, 150 Web Service application 130, 165. Thereafter method 400 includes an act of identifying 410 that the mail message includes an endpoint mail address, a Web Service message, and an identifier. For example, using the custom layer transport 115, 160 the mail message 135, 140 may be identified as including an endpoint 105, 150 mailing address corresponding to the MAPI compliant mail application 110, 155, a Web Service message 120, 125 that is part of a message exchange pattern between client 105 and Web Service 165, and an identifier for identifying the Web Services 165 and a mail exchange type (e.g., request, response, etc.) for the Web Service messages 120, 125.

Based on the Web Service and the mail exchange type for the Web Service message, method 400 also includes an act of sending 415 the Web Service message to the endpoint Web Service application. For example, using various APIs within the custom layer transport 210, 215, 220, after identifying that the mail message includes a Web Service message 120, 125, the Web Service message 120, 125 may be sent to the appropriate service application 130, 165 for processing.

Other exemplary embodiments provide that the Web Service message 120, 125 in method 400 is a request 120 from the client 105 and the endpoint is the Web Service 165. In this embodiment, another Web Service message 125 may be received that includes an addressing scheme identifying the other Web Service message as a response 125 to the request 120. The client's 105's mail address may then be identified within the addressing scheme for sending the response message 125 to the client's 105's MAPI mail application 110. Another mail message 140 is then generated using the MAPI compliant mail application 155, which includes the client's 105's mailing address, the response message 125, and an identifier for identifying the Web Services 165 and the Web Service message type as the response 125. The mail message 140 is then sent to an outgoing mailbox of the MAPI mail application 155 for subsequent delivery to the client 105 over the mail message transport.

FIG. 5 illustrates a flow diagram for a method 500 of providing an NPDL for a Web Services application over a mail transport by utilizing a MAPI mail application in order to support offline communications and generate a NPDL data structure without having to access the Web Service application. Method 500 includes an act of receiving 505 a mail message from an endpoint. For example, referring to FIG. 1B, a NPDL request 190 may be received (from client 105) by MAPI mail application 155 associated with a Web Service application 165. Further, method 500 includes an act of identifying 510 the mail message as requesting an NPDL data structure. For example, the Web Service engine 170 can be used to identify that the NPDL request 190 is a request for an NPDL data structure, which is a specification for describing one or more contracts that an endpoint 105 complies with when exchanging messages with the Web Service application 130, 165.

Method 500 further includes an act of automatically generating 515 the NPDL data structure. For example, Web Service engine 170 may retrieve from store 180 an NPDL 175 for the Web Service 165, or otherwise automatically generate the NPDL data structure 175 without accessing the Web Service application 165. Thereafter, method 500 includes an act of sending 520 the NPDL data structure to the client. For example, Web Service engine 170 may send the NPDL data structure in a response message 185 via the mail message transport. In this embodiment, another mail message 185 may be generated using the MAPI compliant mail application 155. The mail message 185 including the NPDL data structure, a mailing address for the client's 105's MAPI compliant mail application 110, and an identifier for identifying the mail message 185 as including the NPDL data structure. Thereafter, the mail message 185 can be sent to an outgoing mailbox of the server's 150's MAPI compliant mail application 155 for subsequent delivery to the client's 105's MAPI compliant mail application 110.

The NPDL may be WSDL and the NPDL data structure may be an XML document. Further, the mail message 190 may be identified as requesting an NPDL data structure 175 by including an identifier in the subject field of the mail message. Further, the identifier may include a name for the Web Service application 165.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a server in a distributed environment, a method of providing Web Services over a mail transport by utilizing a MAPI (Messaging Application Program Interface) compliant mail application in order to support offline communications and extended processing time of service requests without creating additional infrastructure for such message exchanges, the method comprising acts of:

receiving, at a MAPI compliant mail application running on a server that hosts a Web Service a Web Service message from the Web Service, wherein the Web Service message is received via a custom layered transport that includes a managed MAPI functions layer that is used to convert the Web Service message into an email message that can be sent by the MAPI compliant mail application, wherein the Web Service message is formatted according to an addressing scheme that comprises a transport portion, and an email address portion, wherein the transport portion identifies the use of a MAPI compliant mail application for sending the Web Service message as part of a message exchange pattern between a client and the Web Service that communicate over a mail message transport, and wherein the email address portion defines an email address of the client to which the email message is to be sent, and wherein email messages exchanged between the client and the Web Service are routed through a mail exchange server;

identifying, at the managed MAPI functions layer, the mail address portion within the addressing scheme for sending the Web Service message to the client;

converting, at the managed MAPI functions layer, the Web Service message into an email message, the email message including the email address of the client, the Web Service message, and an identifier for identifying the Web Service and message exchange type for the Web Service message; and transferring the email message to an outgoing mailbox of the MAPI compliant mail application for subsequent delivery to the client over the mail message transport such that the email message is stored in the outgoing mailbox until a connection is made to the mail exchange server.

2. The method of claim 1, wherein the identifier is included in the subject field of the mail message.

3. The method of claim 1, wherein the mail message transport is chosen from SMTP, Hotmail, X.25, or DEC All-In-1.

4. The method of claim 1, wherein the Web Service message is a response message from the Web Service that is sent in response to a request message that was received in an incoming email message from the client.

5. The method of claim 4, further comprising:

receiving the incoming email message, at an incoming mailbox of the MAPI compliant mail application, the incoming email message including the email address for the client, a Web Service request message, and an identifier for identifying the message exchange type as a Web Service request; and detecting that the incoming email message is intended for the Web Service, the detection being performed by the custom layered transport; and routing the email message to the Web Service for processing.

6. The method of claim 1, wherein the MAPI compliant mail application is one of Microsoft Outlook, Outlook Express, or Eudora.

7. A computer storage medium storing computer executable instructions which, when executed by a processor of a server in a distributed environment, perform steps for providing Web Services over a mail transport by utilizing a MAPI (Messaging Application Program Interface) compliant mail application in order to support offline communications and extended processing time of service requests without creating additional infrastructure for such message exchanges, the steps comprising:

receiving, at a MAPI compliant mail application running on a server that hosts a Web Service, a Web Service message from the Web Service, wherein the Web Service message is received via a custom layered transport that includes a managed MAPI functions layer that is used to convert the Web Service message into an email message that can be sent by the MAPI compliant mail application, wherein the Web Service message is formatted according to an addressing scheme that comprises a transport portion, and an email address portion, wherein the transport portion identifies the use of a MAPI compliant mail application for sending the Web Service message as part of a message exchange pattern between a client and the Web Service that communicate over a mail message transport, and wherein the email address portion defines an email address of the client to which the email message is to be sent, and wherein email messages exchanged between the client and the Web Service are routed through a mail exchange server;

identifying, at the managed MAPI functions layer, the email address portion within the addressing scheme for sending the Web Service message to the client;

converting, at the managed MAPI functions layer, the Web Service message into an email message, the email message including the email address of the client, the Web Service message, and an identifier for identifying the Web Service and message exchange type for the Web Service message; and transferring the email message to an outgoing mailbox of the MAPI compliant mail application for subsequent delivery to the client over the mail message transport such that the email message is stored in the outgoing mailbox until a connection is made to the mail exchange server.

8. The computer storage medium of claim 7, further comprising a step for:

deleting the email message from the outgoing mailbox once the email message is sent to the client in order to conserve memory resources.

9. The computer storage medium of claim 7, wherein the identifier is included in the subject field of the mail message.

10. The computer storage medium of claim 7, wherein the mail message transport is chosen from SMTP, Hotmail, X.25, or DEC All-In-1.

11. The computer storage medium of claim 7, wherein the Web Service message is a response message from the Web Service that is sent in response to a request message that was received in an incoming email message from the client.

12. The computer storage medium of claim 11, further comprising steps for:

receiving the incoming email message, at an incoming mailbox of the MAPI compliant mail application, the incoming email message including the email address for the client, a Web Service request message, and an identifier for identifying the message exchange type as a Web Service request; and detecting that the incoming email message is intended for the Web Service, the detection being performed by the custom layered transport; and routing the email message to the Web Service for processing.

13. The computer storage medium of claim 7, wherein the MAPI compliant mail application is one of Microsoft Outlook, Outlook Express, or Eudora.

14. At a computing system in a distributed environment, a method of distributing an NPDL (Network Protocol Description Language) for a Web Service over a mail transport by utilizing a MAPI (Messaging Application Program Interface) compliant mail application in order to support offline communications and generate an NPDL data structure without having to access the Web Service, the method comprising acts of:

receiving, from a client, a mail message at an incoming mailbox of a MAPI compliant mail application associated with a Web Service, the mail message including a Web Service request message, wherein the mail message is received from an outgoing mailbox of a MAPI compliant mail application and wherein the mail message was stored in the outgoing mailbox until a connection was made to a mail exchange server that routes mail messages between a client and a Web Service, and wherein the Web Service request message is formatted according to an addressing scheme that comprises a transport portion, and an email address portion, wherein the transport portion identifies the use of a MAPI compliant mail application at the client for sending the Web Service request message as part of a message exchange pattern between the client and the Web Service that communicate over a mail message transport, and wherein the email address portion defines an email address of the Web Service;

transferring the mail message to a custom transports interface that acts as an interface between the MAPI compliant mail application and the Web Service;

identifying, at the custom transport interface, that the Web Service request message within the mail message is a request for an NPDL data structure by detecting an identifier within the Web Service request message, wherein the NPDL data structure is a specification for describing one or more contracts that an endpoint application complies with when exchanging messages with the Web Service;

automatically generating the NPDL data structure at the custom transport interface without accessing the Web Service; and sending the NPDL data structure to the client as part of a return mail message, wherein the return mail message includes an email address for the client, and an identifier for identifying the return mail message as including the NPDL data structure.

15. The method of claim 14, wherein the NPDL is WSDL and wherein the NPDL data structure is an XML document.

16. The method of claim 14, wherein the identifier is included in the subject field of the mail message.

17. The method of claim 16, wherein the identifier in the subject field includes a name for the Web Service.

* * * * *